Dec. 25, 1934.   R. F. LEE   1,985,610
TRANSIT CONCRETE MIXER
Filed April 18, 1930   3 Sheets-Sheet 1
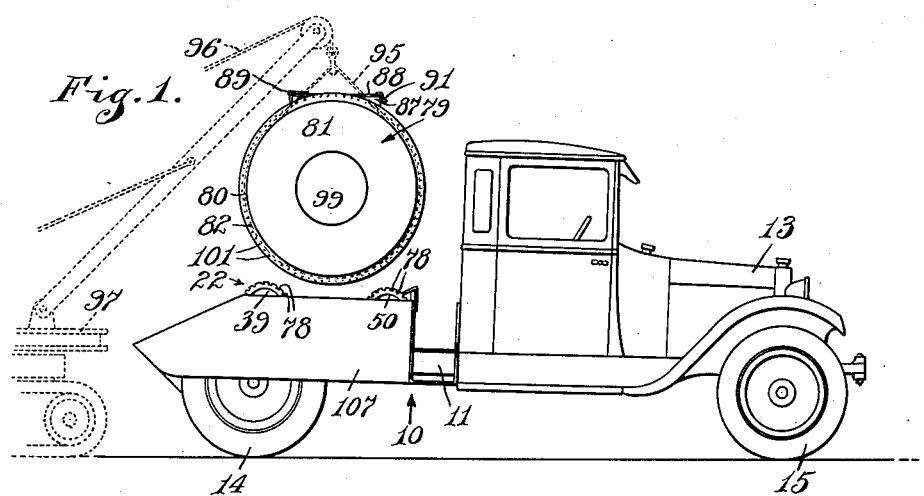
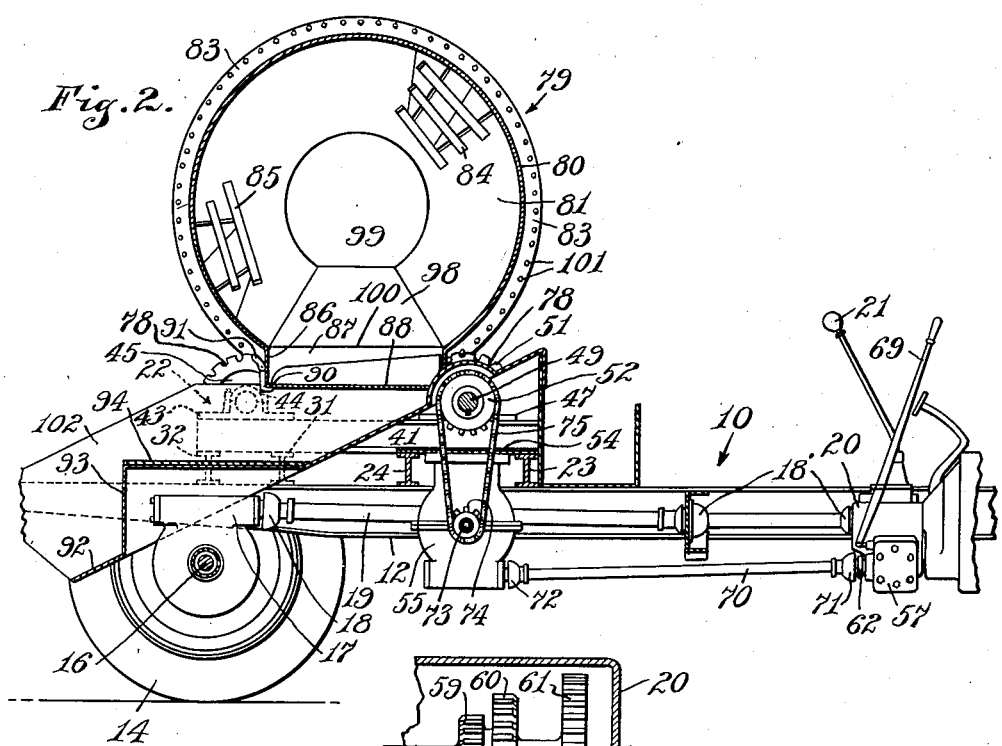
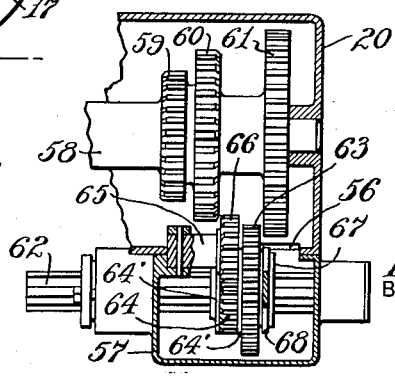
INVENTOR
Roscoe F. Lee,
BY
Hood + Hahn
ATTORNEYS Dec. 25, 1934.   R. F. LEE   1,985,610
TRANSIT CONCRETE MIXER
Filed April 18, 1930   3 Sheets-Sheet 2
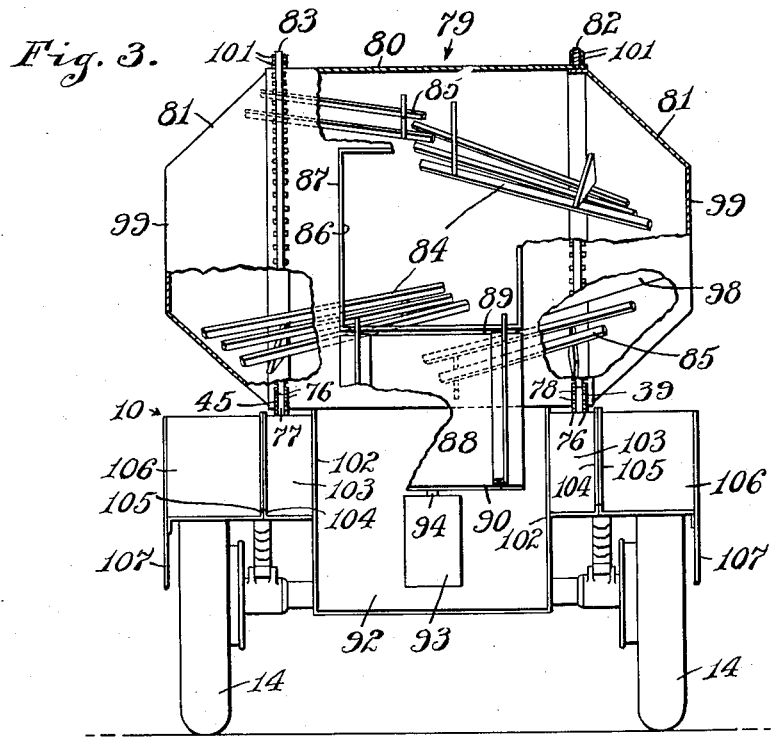
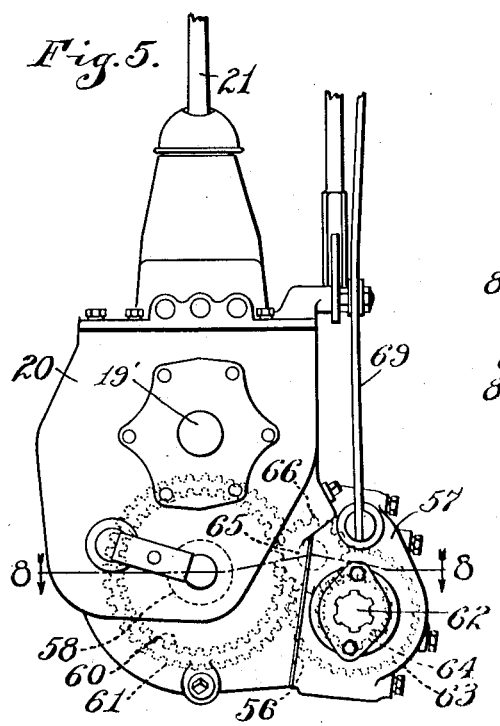
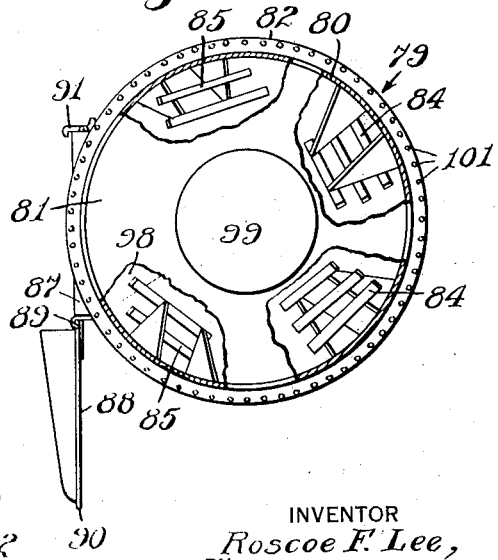
INVENTOR
Roscoe F. Lee,
BY
Hood + Hahn.
ATTORNEYS Dec. 25, 1934.  R. F. LEE  1,985,610
TRANSIT CONCRETE MIXER
Filed April 18, 1930  3 Sheets-Sheet 3
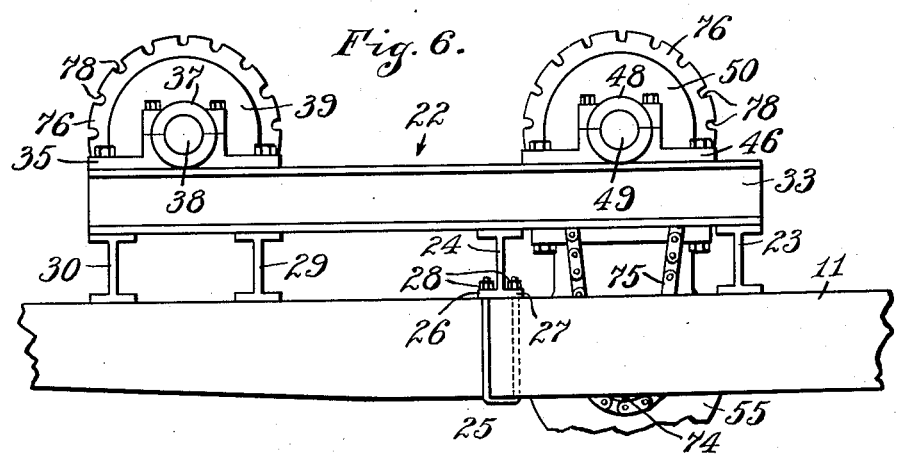
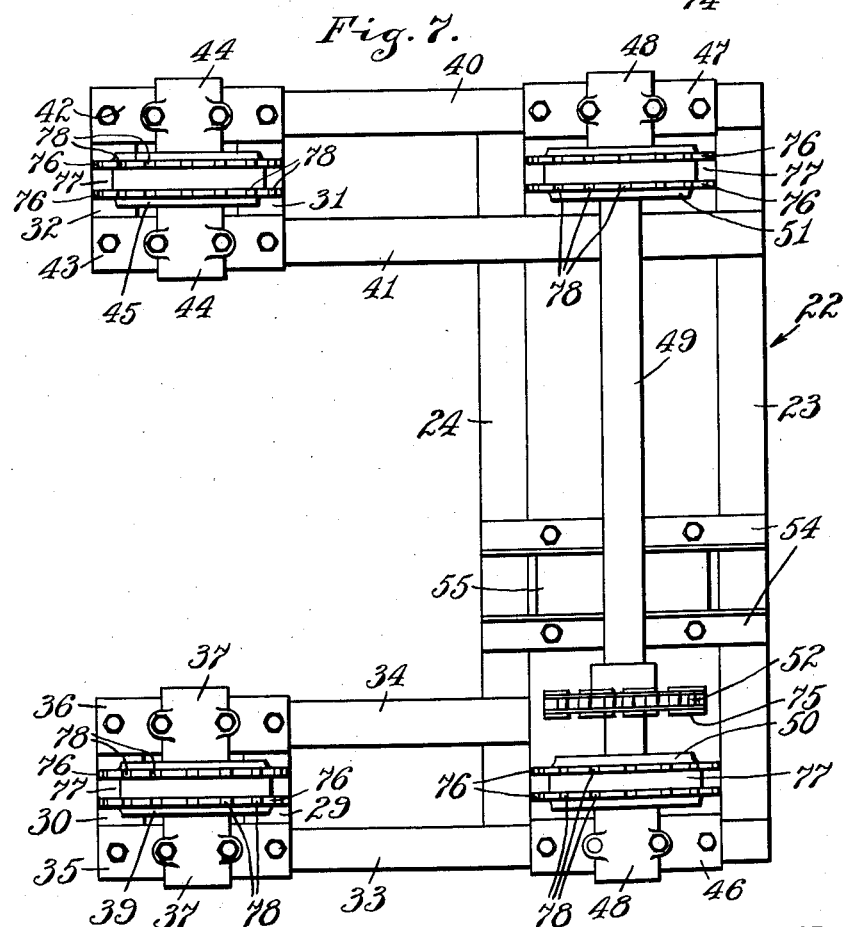
INVENTOR
Roscoe F. Lee,
BY
Hood + Hahn.
ATTORNEYS Patented Dec. 25, 1934

1,985,610

UNITED STATES PATENT OFFICE 1,985,610

TRANSIT CONCRETE MIXER

Roscoe F. Lee, Indianapolis, Ind., assignor to Lee Transit Mixer Corporation, Indianapolis, Ind., a corporation of Indiana Application April 18, 1930, Serial No. 445,273

9 Claims. (Cl. 83—73)

The present application relates, as indicated to a transit mixer. Briefly stated, a transit mixer comprises a vehicle, preferably automotive in character, which carries a drum or other container and which is adapted to mix or agitate the contents of such drum by mechanical means driven by power generated either by the power plant of the vehicle, by a separate power plant, or from the motion of the vehicle over the ground. The present application is directed more particularly to a transit mixer in which material to be agitated is carried in a drum rotatably mounted upon the vehicle and driven from the power plant of the vehicle, means being provided whereby the drum may be rotated about its own axis in either of two opposite directions, or may be permitted to rest, without regard to whether or not the vehicle is being moved. An object of the invention is to provide an attachment unit whereby any automotive vehicle may be converted into a transit mixer. Further objects of the invention will appear as the description proceeds. The accompanying drawings illustrate my invention.

Fig. 1 is a side elevation of a device constructed in accordance with the present invention, and illustrating the manner in which the drum may be lifted off the vehicle;

Fig. 2 is a substantially central longitudinal section through a portion of the device;

Fig. 3 is a rear elevation of the device, portions thereof being broken away to illustrate certain details;

Fig. 4 is an end elevation of the drum, portions of the end of the drum being broken away for clarity of illustration;

Fig. 5 is an end elevation of the transmission mechanism;

Fig. 6 is a side elevation of a portion of the attachment unit;

Fig. 7 is a plan of the attachment unit; and

Fig. 8 is a horizontal section taken substantially on the line 8—8 of Fig. 5.

Referring more particularly to the drawings, it will be seen that I have shown a vehicle, indicated generally at 10, and comprising a chassis having side frame members 11 and 12 extending substantially the full length of the vehicle. A power plant (not shown) is mounted on the vehicle, being enclosed by the usual hood 13. The vehicle 10, as usual, is provided with traction wheels 14 and steering wheels 15. Of course, it is to be understood that, while I have illustrated a vehicle provided with road wheels, my invention contemplates the use of vehicles provided with any type of traction means.

The traction wheels 14 are carried by the usual floating axles indicated at 16, said axles being driven through a worm reduction indicated generally at 17. A drive shaft 19 is connected through the usual universal 18 to drive the worm of the reduction 17, and, through one or more sets of universals 18', to the drive spindle 19' of a selective speed transmission indicated at 20. Said transmission is controlled by the usual lever 21.

Referring more particularly to Figs. 6 and 7, it will be seen that the attachment unit is indicated generally at 22 and comprises a U shaped frame the base of which comprises a pair of parallel I beams 23 and 24 having their opposite ends mounted respectively upon the chassis members 11 and 12. Of course the beams 23 and 24 are intended to be securely fastened to the members 11 and 12, and one fastening means which I have found to be extremely satisfactory is illustrated, in one instance, in Fig. 6. Such means comprises a U bolt 25 extending beneath the chassis member 11 and having its one arm lying on the outside of said chassis member and extending through one flange 26 of the beam 24, and its other arm lying on the inside of the chassis member 11 and passing through the opposite flange 27 of beam 24. Of course, the two arms of the U bolt 25 are secured in place by nuts 28 turned down against the flanges 26 and 27. It will be obvious that this or other fastening means will be applied to each of the several I beams hereinafter mentioned.

A pair of short I beams 29 and 30 are secured to the member 11 at points spaced to the rear of the location of the beam 24. Said beams 29 and 30 are secured only at their outer ends to the chassis member 11 and project inwardly, parallel to the beams 23 and 24, as shown. Similar short I beams 31 and 32 are secured to the opposite chassis member 12, projecting toward the beams 29 and 30 in alignment therewith.

An I beam 33 is secured to the upper surfaces of the beams 23, 24, 29 and 30, said beam 33 lying substantially in the plane of the chassis member 11. Parallel to, and in the same horizontal plane with, the beam 33, there is mounted a further I beam 34 carried on and secured to the inner ends of the beams 29 and 30, and secured also to the beam 24, but terminating at the forward edge of said beam 24. On the rear end of the beam 33 there is mounted a bearing member 35, and a similar member 36 is similarly mounted on the beam 34. Caps 37 complete the bearings formed by the members 35 and 36 and secure in place a shaft 38 upon which is mounted a wheel 39, the purpose of which will be stated hereinafter.

Two I beams 40 and 41 are secured to the upper surfaces of the beams 31, 32, 23, and 24, the beam 40 lying substantially in the vertical plane of the chassis member 12 and the beam 41 being parallel therewith and spaced somewhat inwardly therefrom. At its rearward end, the beam 40 carries a bearing member 42, and a bearing member 43 is similarly carried on the beam 41. Caps 44 complete the bearings formed by the members 42 and 43 and secure in place a shaft upon which is mounted a wheel 45.

Similar bearing members 46 and 47 are carried respectively by the beams 33 and 40 adjacent the front ends thereof, and caps 48 complete the bearings formed by said members and secure in place a shaft 49. A wheel 50 is keyed to the shaft 49 in the vertical plane including the wheel 39, and a wheel 51 is keyed to the shaft 49 in the vertical plane including the wheel 45. A sprocket 52 is keyed to the shaft 49 at a point adjacent the wheel 50.

A pair of angle irons 54 are secured to the beams 23 and 24 in parallel spaced relation, and form a support from which is hung a gear reduction unit 55.

Referring now more particularly to Figs. 2, 5 and 8, it will be seen that the transmission housing 20 is formed adjacent its base and on its one side with an opening 56 surrounded by a flat surface to which is secured a casing 57. The housing 20 mounts the usual jack shaft 58 carrying the usual gear constantly in mesh with a pinion on the clutch spindle (not shown). Thus the jack shaft 58 is in rotation at all times when the usual clutch of the vehicle is engaged and the engine is running. As is usual, the jack shaft 58 carries three pinions 59, 60 and 61 of increasing pitch diameters. A shaft 62 is carried in the casing 57 in substantially parallel relation with the jack shaft 58, and said shaft 62 has splined thereon a gear 63 and a gear 64 of smaller pitch diameter. An arbor 65 is carried by the casing 57 in parallel relation with the shaft 62, and an idler gear 66 is slidably and rotatably mounted upon said arbor 65, being movable with the gear 64 through the medium of the usual shroud members 64'. A collar 67 secured to the gears 63 and 64 receives a yoke 68 operable by a lever 69, whereby the gears 63, 64 and 66 may be moved longitudinally of the shaft 62 and arbor 65.

A shaft 70 is connected through a universal joint 71, with the shaft 62; and through a universal 72 with the worm forming a part of the reduction unit 55. The spindle 73 of said unit 55 carries a sprocket 74 with which is engaged a chain 75 engaging also the above mentioned sprocket 52 on the shaft 49.

Each of the wheels 39, 45, 50 and 51 is, according to the present embodiment, provided with peripherally extended flanges 76 forming therebetween an annular channel 77. Preferably, the flanges 76 are formed with spaced radial notches 78 for a purpose to be disclosed hereinafter.

It will be seen that the attachment unit 22 comprises a cradle adapted for the reception of a drum 79. Said drum preferably comprises a cylindrical body portion 80 having its ends closed by frusto-conical heads 81. Adjacent one end of the cylindrical body portion 80 there is provided a radially extending peripheral flange 82, and a similar flange 83 is provided at the opposite end of the body portion 80. When the drum is positioned on the cradle, the flange 82 is received in the channels 77 of the wheels 39 and 50, and the flange 83 is received in the channels 77 of the wheels 45 and 51.

Within the drum 79 there are mounted a plurality of baffles or agitating blades 84 and 85, said blades 84 each comprising three slats secured upon braces fastened to the inner surface of the drum, and said blades 85 each comprising two slats secured to similar braces. The blades 84 and 85 are so constructed and arranged that, as the drum 79 is rotated in one direction about its axis, the blades tend to agitate the contents of the drum and to move the same toward the ends of the heads 81; whereas, as the drum is rotated in the opposite direction, the blades tend to agitate the contents thereof and to move the same toward the axial center of the drum 79.

In its peripheral wall, the body portion 80 of the drum 79 is formed with an opening 86 surrounded by a rail or flange 87 which is of such dimensions that its outer edges lie in a single plane. To one edge of said flange 87 parallel with the axis of the drum there is hinged, as at 89, a door 88, formed substantially as a plane for cooperation with the outer edges of said flange, the free edge of said door being formed with a lip 90 for cooperation with the latch member 91 pivotally mounted upon the opposite side of the flange 87, and preferably spring pressed to engaging position. The opening 86 comprises the only port through which material may enter or be discharged from the drum 79.

An inclined chute 92 is suitably secured, in a manner later to be described, between the legs of the U shaped frame 22, and extends rearwardly and downwardly from a point adjacent the shaft 49. The bottom surface of said chute 92 is necessarily formed with a projection 93, the same being provided to give clearance to the worm reduction 17. Upon its upper surface, the projection 93 carries a wear plate or strip 94 for a purpose later to be described.

The side walls 102 of the chute 92 have secured thereto members 103 provided with upturned flanges 104 at their outer edges. To each flange 104 there is secured an upturned flange 105 at the inner edge of a fender member 106 the outer edge of which carries a side plate 107, as is most clearly shown in Fig. 3.

It will be seen that I have provided a unit which may be attached to a standard vehicle, the same comprising a cradle frame mountable upon a vehicle chassis and carrying a drum and a discharge chute, together with power take off means adapted to deliver power from the power plant of the vehicle to the drum.

In operation, the drum 79 being mounted upon the cradle 22, if the engine of the vehicle 10 is operating and the vehicle clutch is out of engagement, the lever 69 may be shifted in one direction to move the gear 63 into mesh with the pinion 61. If the vehicle clutch is now engaged, the shaft 62 will be rotated and, through the shaft 70 and reduction unit 55, the shaft 49 will be driven. Wheels 50 and 51 will thus be rotated and, through the engagement of the pins or lugs 101 projecting axially from opposite sides of the flanges 82 and 83 with the notches 78 in the flanges 76 of said wheels, the drum 79 will be rotated about its axis. Since power is taken to the shaft 62 from pinions on the shaft 58, and since the rotation and speed of rotation of the shaft 58 are dependent solely upon the operation and speed of operation of the engine, it will be seen that the drum 79 may be driven at a speed dependent solely upon the speed of the engine whether or not the vehicle is in motion, and regardless of the setting of the selective speed transmission 20.

If it is desired to rotate the drum 79 in the opposite direction, the lever 69 may be shifted in the opposite direction to bring the idler gear 66 into mesh with the pinion 60. As is clearly shown in Fig. 3, the lever 69 may be moved to a neutral position in which the shaft 62 will not be driven at all.

An important feature of the present invention lies in the fact that the drum 79 is restrained against upward movement by gravity only, though it is restrained against movement in any other direction with respect to the vehicle by its engagement with the wheels 39, 45, 50 and 51. As a result of this arrangement, and of the fact that the door in said drum is formed in the peripheral surface thereof, rather than in an end, it is possible to deliver the contents of the drum at a point absolutely inaccessible to the vehicle. For instance, if concrete is to be delivered from the drum to a form at some great elevation, or if concrete is to be delivered from the drum to a form in a deep excavation, a strap or bridle 95 may be passed about the drum 79, attention being called to the fact that the drum is supported solely on the wheels, and consequently there is room beneath the same for the passage of such a strap. The cable 96 of a hoisting engine suggested at 97 in Fig. 1 may then be secured to the bridle 95, and the drum may be lifted bodily off the vehicle and moved to the point of desired discharge. Depending upon the point of discharge which may be desired, the drum may be lifted in the position shown in Fig. 1, or it may be rotated to the position of Fig. 2 and lifted with the door 88 at its lowermost position. If the drum is lifted in such position, it will be obvious that, after it has been moved to the point of desired discharge, the latch 91 may be tripped to permit the door 88 to open to permit discharge of the contents of the drum.

One feature of the present drum is most clearly illustrated in Fig. 2. It will be seen that a wall 98 is provided forming a plane surface extending from the apex 99 of the frusto-conical head 81 to the adjacent edge 100 of the opening 86. Obviously, another of these walls 98 is provided to extend from the apex of the opposite head 81 to the opposite wall 100 of the opening 86. This arrangement, of course, facilitates complete discharge of the contents of the drum.

Normally, of course, discharge will be effected directly from the truck into a prepared container. Where such discharge is to be effected, the drum is moved into the position of Fig. 2 and the latch 91 is tripped. The free end of the door 88 falls, pivoting about the hinge 89, and strikes the wear strip 94. The contents of the truck falls, of course, into the chute 92 and slides down the same to the point of discharge. In the case of extremely viscous or sticky material, it sometimes happens that the discharging material becomes lodged in the chute, and particularly on the upper surface of the projection 93. The importance of the reversibility of the driving means for the drum, and of its independence of the driving means for the traction wheels of the vehicle, together with the planar form of the door 88, here becomes more apparent. In case of such lodging, the operator can oscillate the drum about its axis, turning it first in one direction and then in the other, whereby the free straight edge 90 of the door 88 is caused to slide back and forth along the wear plate 94, acting as a scoop to force the material downwardly out of the chute.

I claim the following:

1. An attachment for vehicles comprising a U-shaped frame, means for securing the legs of said frame to a vehicle chassis, a shaft having its ends journalled in bearings mounted on said legs at the base of said frame, a channeled wheel mounted on said shaft substantially in the median plane of each of said legs, a shaft mounted in bearings adjacent the free end of one of said legs, a channeled wheel mounted on said shaft substantially in the plane of one of said first mentioned wheels, a further shaft mounted in bearings adjacent the free end of the other of said legs, and a channeled wheel mounted on said shaft substantially in the plane of the other of said first-mentioned wheels.

2. An attachment for automotive vehicles comprising a U-shaped frame, means for securing said frame to a vehicle chassis, a chute secured to said frame and extending from the base of said frame downwardly and rearwardly between the legs of said frame, a drum, means for mounting said drum on said frame, and means operatively engaging said last-mentioned means and adapted for cooperating engagement with the power means of such vehicle for causing rotation of said drum about its own axis.

3. An attachment for automotive vehicles comprising a U-shaped frame, means for securing said frame to a vehicle chassis, a chute secured to said frame and extending from the base of said frame downwardly and rearwardly between the legs of said frame, a drum, means for mounting said drum on said frame, said last-named means restraining said drum against lineal movement in any direction except vertically upward, and said drum being restrained against upward movement by gravity only, said drum being formed with an opening in its peripheral wall, a door normally closing said opening, and means adapted for connection to the power means of said vehicle for driving said mounting means to effect rotation of said drum about its own axis.

4. In a mixer of the class described, the combination with a vehicle having a power takeoff associated therewith, of a mixer drum, rotatably mounted supporting wheels for said drum, means for utilizing power from said power takeoff for driving certain of said supporting wheels, track rails surrounding said drum and adapted to engage said wheels, and means extending laterally from said track rails adapted to engage said wheels for positively driving said drum from the driven supporting wheels.

5. In a mixer for concrete or the like, a rotating drum, track rails surrounding said drum, supporting wheels for said drum, said wheels having peripheral channels for the reception of said track rails, means for imparting driving power to said supporting wheels, and means for imparting a positive drive to said drum.

6. In a mixer, a plurality of supporting wheels having peripheral channels and notches in their edges, a mixing drum, track rails surrounding said drum and resting in the channels of said supporting wheels, said wheels and track rails forming the sole support for said drum, means on said track rails adapted to successively engage the notches of said supporting wheels, and means for driving certain of said wheels for imparting rotating movement to the drum.

7. In a mixer for concrete, or the like, a rotating drum, peripheral flanges on said drum, a plurality of pairs of peripherally channeled wheels, each pair of said wheels receiving one of said flanges in its channels, intermeshing means on one of said flanges and one of said wheels, and means for driving said one wheel.

8. The combination with a vehicle chassis, of a cradle mounted on said chassis and comprising a plurality of peripherally channeled wheels, a drum supported on said wheels and restrained against upward movement by gravity only, cooperating means on said drum and wheels restraining said drum against movement with respect to said wheels in any other direction, power means for driving one of said wheels, and intermeshing means on said drum and on said one wheel.

9. In a mixer for concrete, or the like, a rotating drum, a peripherally projecting flange on said drum, a pair of wheels mounted on parallel axes in substantially a single plane, said wheels being peripherally channeled and receiving said flange, one of said wheels being formed with transverse notches in its periphery, a plurality of axially projecting elements carried by said flange and adapted to engage successively in said notches, and means for driving said one wheel.

ROSCOE F. LEE.